No. 684,640. Patented Oct. 15, 1901.
H. W. JOHNS.
APPARATUS FOR MOLDING FIBROUS MATERIAL.
(Application filed May 24, 1901.)
(No Model.)
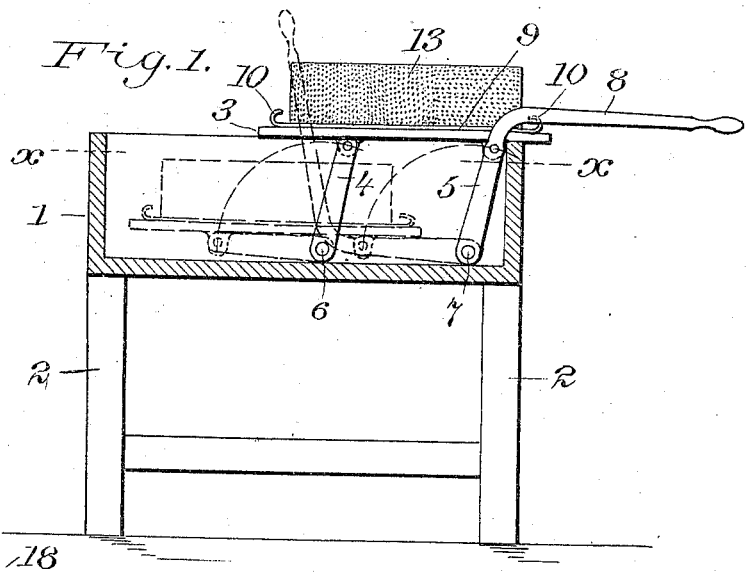
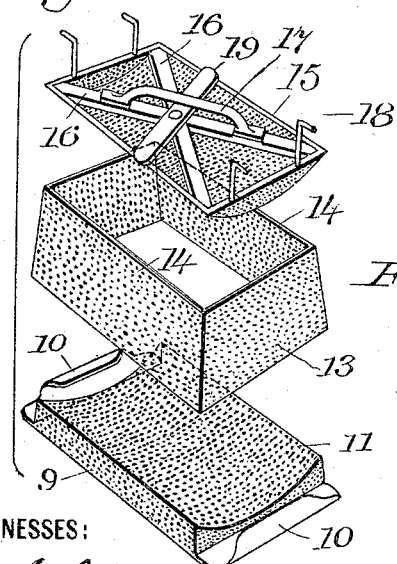
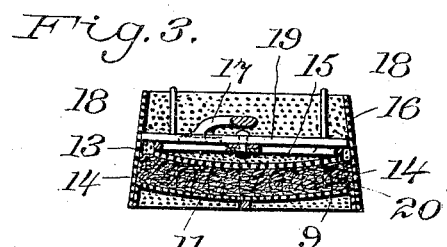
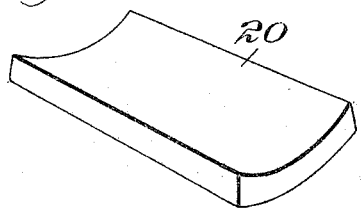
WITNESSES:
INVENTOR
Henry W. Johns.
BY
ATTORNEY

UNITED STATES PATENT OFFICE.

HENRY W. JOHNS, OF NEW YORK, N. Y.

APPARATUS FOR MOLDING FIBROUS MATERIAL.

SPECIFICATION forming part of Letters Patent No. 684,640, dated October 15, 1901.

Application filed May 24, 1901. Serial No. 61,803. (No model.)

*To all whom it may concern:*

Be it known that I, HENRY W. JOHNS, a citizen of the United States of America, and a resident of the city of New York, county of New York, State of New York, have invented certain new and useful Improvements in Apparatus for Molding Fibrous Material, of which the following is a specification.

My invention relates in general to the formation or molding of sheets or blocks of fibrous material by the method of compressing the same and saturating them with some cementitious fluid, and more specifically consists of an improved apparatus for molding such sheets or blocks and immersing them in the cementitious fluid. The materials which may be so compressed and molded in my apparatus are of varying nature; but perhaps the most important application of the invention is the formation of sheets or blocks of asbestos fiber in such shape that they may be employed as a non-conducting covering or lagging for steam-boilers, steam-pipes, &c. Heretofore it has been customary to form such sheets or bats of this material by depositing the same in layers and sprinkling each layer with silicate of soda or other fireproof cementitious material. It has also been customary to form a body of asbestos fiber by mixing up with the loose fiber a dry cementitious material, such as plaster-of-paris, and then subjecting the bat formed from such mixture to moisture sufficient to produce an adhesion at separate points along the fibers wherever a particle of plaster-of-paris might lodge.

The object of my invention is to produce a sheet or slab of asbestos fiber of more uniform and homogeneous structure than those produced by either of the above-described processes and one in which the cementitious material shall be thoroughly and evenly distributed through every portion of the structure, and this I accomplish by assembling and compressing the necessary quantity of asbestos fiber and then immersing the entire body thereof in a solution of silicate of soda or of other cementitious fluid. The preferred form of apparatus embodying my invention for carrying out this purpose is illustrated in the accompanying sheet of drawings, in which—

Figure 1 is a side elevation and partial section of the completed apparatus. Fig. 2 is an enlarged detail perspective view of the parts of the perforated mold in which the block of compressed and cemented fiber is formed. Fig. 3 is a cross-section of the same with the parts assembled and showing the sheet or block of material in position, and Fig. 4 is a perspective view of such completed block or sheet of non-conducting material.

Throughout the drawings like referencefigures indicate like parts.

A tank 1, filled to about the level of the dotted line $x\ x$, Fig. 1, contains the cementitious fluid, such as silicate of soda, and rests upon any suitable supports 2 2. A table 3 is adapted to be alternately immersed in the tank of fluid and withdrawn therefrom; and a convenient means for accomplishing this consists of the parallel links 4 and 5, pivoted to the bottom of the tank at 6 and 7 at their lower ends and pivoted to the table 3 at their upper ends. Any convenient means, such as the bent handle 8, may be employed to conveniently vibrate these links from the horizontal position shown in the dotted lines, which immerses table 3, to the more nearly upright position shown in the full lines. In swinging the links from the horizontal position through an arc of a little more than ninety degrees before the link 5 or table 3 rests against the side of the tank 1 the links are carried past their supporting centers 6 and 7 and remain in their upright position until forcibly vibrated back again by pressure on the handle 8. Said handle 8 is a projection from one of the links 5 and, as shown, is bent at an angle of nearly ninety degrees to said link, so that when the link is in its upper position the handle 8 extends to one side of the tank and is not in the way of the operator, whose normal position is one facing the tank, as shown in Fig. 1, with his back to the onlooker.

On the table is a mold of perforated metal, preferably in three parts, as shown in Fig. 2. The lower part or bed-piece 9 may have a curved upper surface 11 or such other shape as it is desired to give to the block of material to be formed. Preferably the ends of the metal are curled up, as shown at 10 10, to afford a convenient means of grasping same for hauling the bed-plate along on the table, also for enabling the same to override any small obstructions. The main body of the mold consists of the cage 13, of perforated metal, preferably, and preferably having an outward flare to its sides 14 14, as shown in the drawings. A cover 15, also preferably of perforated metal, may have the curved under surface shown or such other shape as it is desired to give to the block and is adapted to be inserted into the cage 13 and to press down the material within said cage. This cover may have the strengthening-ribs 16 16, as shown, the handle 17, and sundry stops 18 18 to limit the distance to which it may be forced down into the cage. It may also have the pivoted cross-bar 19 or other means adapted to engage the sides of the cage 13 and hold the cover in its depressed position. The bed-piece 9 may also have one or more strengthening-ribs 11, arranged underneath to prevent its buckling under pressure.

The method of operating my invention is as follows: The cage 13 is placed upon the bed-piece 9, and both are placed upon the table 3 in the position shown in Fig. 1. The asbestos fiber or other material is then placed in said cage 13 and thoroughly and evenly distributed by hand or by other means. The cover 15 then being placed on top of the mass of fiber is forced down upon the same and moved from side to side in order to evenly compress the fiber to the desired thickness, which is determined by the adjustment of the stops 18 18. The cover may then be locked in position by swinging the pivoted bar 19 around, so that its ends will jam against the flaring sides 14 14 of the cage 13. The cage then being held down in position by the hand or otherwise the operator grasps the handle 8 with his left hand and swinging it up into the position shown in the dotted lines immerses the cage or mold completely in the fluid contained in the tank 1, holding it there a sufficient length of time to insure the complete saturation of the mass of fiber 20 by the cementitious fluid. On reversing the movement of the handle 8 and links 4 and 5 the mold and its contents will be withdrawn from the cementitious fluid back into position shown in Fig. 1. The operator then lifts off the cage 13 and cover 15, leaving the molded block 20 upon the bed-plate 9. This may be passed on to another operator working with dry hands, who will trim it up and pass it on to the drying-room.

The advantages of my invention consist in its convenience and the rapidity with which it may be operated, the simplicity of the mechanism, and the fact that it produces a solid homogeneous block of material saturated evenly throughout with the cementitious material devoid of layers and also devoid of intermediate uncemented spaces.

It is evident, of course, that various changes in the details of apparatus shown might be made without departing from the spirit and scope of my invention. The mold might be arranged to produce blocks of different shape, and the mechanism for raising and lowering the table might be changed. Other forms of stops might be employed and other means for locking the cover in its depressed position. Apparatus embodying certain of the features above described might be employed without presenting certain other features so described; but such varying form I should consider merely modifications of my invention.

Having therefore described my invention, what I claim as new, and desire to protect by Letters Patent, is—

1. The combination of the tank of cementitious fluid, the table adapted to be immersed therein or withdrawn therefrom, and the perforated mold carried by said table.

2. The combination of the tank, the table supported on parallel links pivoted to the bottom of said tank in such position that the table and links may lie flat upon the tank-bottom, or rest against one wall of the tank after moving through an arc of more than ninety degrees, and means for vibrating said pivoted links through such arc.

3. The combination of the tank, the table supported on parallel links pivoted to the bottom of said tank in such position that the table and links may lie flat upon the tank-bottom, or rest against one wall of the tank after moving through an arc of more than ninety degrees, and means for vibrating said pivoted links through such arc, said means comprising a projection from one of said links in the form of a handle bent at nearly a right angle to the link.

4. In a mold for forming and immersing a body of fibrous material, the combination of the perforated bed-piece, the coöperating cage, the perforated cover adapted to be forced down into said cage, and stops for limiting the downward motion of said cover.

5. In a mold for forming and immersing a body of fibrous material, the combination of the perforated bed-piece, the coöperating cage, the perforated cover adapted to be forced down into said cage, and means for holding said cover depressed within said cage.

6. In a mold for forming and immersing a body of fibrous material, the combination of the perforated curved bed-piece, the coöperating cage having downwardly-flaring sides, the perforated curved cover adapted to be forced down into said cage and means for holding said cover depressed within the cage.

7. In a mold for forming and immersing a body of fibrous material, the combination of the perforated bed-piece, the coöperating cage, the perforated cover adapted to be forced down into said cage, and stops for limiting the downward motion of said cover, together with means for holding said cover depressed within said cage.

Signed at New York, N. Y., this 30th day of April, 1901.

HENRY W. JOHNS.

Witnesses:
W. H. PUMPHREY,
M. G. CRAWFORD.